United States Patent Office 3,641,121
Patented Feb. 8, 1972

3,641,121
PREPARATION OF VINYL ACETATE
Harold E. Swift, Gibsonia, Pa., assignor to Gulf Research & Development Company, Pittsburgh, Pa.
No Drawing. Filed Jan. 12, 1968, Ser. No. 697,305
Int. Cl. C07c 67/04
U.S. Cl. 260—497 A                 8 Claims

ABSTRACT OF THE DISCLOSURE

A process for the preparation of vinyl acetate from acetic acid, ethylene and oxygen in the presence of a noble metal on an inert, high surface area support with at least about 80 percent of its pores having a diameter between about 10 and 35 angstroms.

---

This invention relates to a process for producing strikingly improved yields of vinyl acetate from the reaction of acetic acid, ethylene and oxygen over a noble metal catalyst on an inert high surface area support with at least about 80 percent of its pores having a diameter in the range of between about 10 and 35 angstroms.

Heretofore, the fixed catalyst bed reactions of acetic acid, ethylene and oxygen over a noble metal catalyst, both supported and unsupported, have resulted in very low yields. This has been particularly true with platinum as the catalyst. In view of these low yields any material improvement in the yield would be of significance in improving the economic utility of the process. In accordance with my discovery described herein, I have unexpectedly found that a significant improvement in per pass yield results when the catalyst is supported on a high surface area support having a specific pore size distribution. Notwithstanding the wide variation in surface areas and pore size distributions generally found in catalyst supports, I have made the surprising discovery that, in this particular reaction for the production of vinyl acetate, the use of a supported noble metal catalyst in which the support has a surface area of at least about 600 m.²/g. with at least about 80 percent of the pore diameters falling in the range of about 10 to about 35 angstroms results in this significant improvement in yield. The reason for this relationship of yield with pore size distribution in this reaction is not understood, nevertheless, repeated experimentation has verified the special advantages resulting when the catalyst support is restricted to the surface area and pore diameter distribution within these limits.

Any of the noble metals, platinum, palladium, rhodium, ruthenium, osmium and iridium can be used as the catalyst component. Mixtures of these noble metals can also be used. These supported noble metals are used as the metal salt or ionic form or preferably as the reduced or free metal. A co-catalyst or promoter such as copper, iron, tin, etc., is also advantageously used, either as the metal salt or ionic form or preferably as the free metal. The preferred catalyst in my invention contains platinum preferably with copper as a co-catalyst or promoter, since an exceptionally great improvement in yield has been accomplished with my invention using platinum, particularly in the metallic state, on a support possessing the characteristics described herein.

Any suitable inert support which is non-cracking or is treated to be non-cracking such as carbon, silica, a zeolite, etc., can be used for the catalyst provided that the support has a high surface area preferably at least about 600 m.²/g. and most preferably at least about 800 m.²/g. and has a pore diameter concentration of at least about 80 percent in the about 10 to about 35 angstrom range and preferably with at least about 85 to 90 percent of the pore diameters between about 10 and about 25 angstroms. Suitable supports include activated carbon; silica prepared by passing a sodium silicate solution through acid treated IR–120 resin (Rohm and Haas Co.), neutralizing to pH 7 with ammonium hydroxide, drying the filtered precipitate at 110° C. and calcining at 1000° F. for 16 hours; artificially prepared zeolites treated to be non-cracking, etc., provided that they at least possess the minimum surface area and are restricted to the required pore size distribution.

The reaction rate using platinum as thhe catalyst increases substantially linearly as the platinum content is increased in the catalyst up to about 2.5 weight percent platinum at which point the reaction rate begins to level off. Above about 4 weight percent platinum in the catalyst, no significant increase in reaction rate is observed with an increase in platinum. Therefore, although the catalyst can contain as little as about 0.5 weight percent noble metal up to about 5 weight percent or more, the preferred concentration of noble metal is about 2 to 3 weight percent in order to obtain the most active catalyst withhout an uneconomical use of the valuable noble metal. The metallic co-catalyst, which, in part, serves to stabilize the selectivity of the noble metal, is desirably used in molar excess compared with the noble metal. The molar ratio of noble metal to promoter metal can broadly range from about 0.1 to about 3 to 1 and preferably range from about 0.3 to about 0.9 to 1. When platinum and copper are used, the preferred molar ratio of platinum to copper is about 0.6.

The catalyst can suitably be made by impregnating the support with an aqueous solution of the metal salt or salts. Suitable salts include the halogen and nitrate salts of the metals including $PtCl_4$, $Pt(NH_3)_4(NO_3)_2$, $$RhCl_3 \cdot 3H_2O$$

$Pd(NO_3)_2$, $CuCl_2 \cdot 2H_2O$, $Cu(NO_3)_2 \cdot 6H_2O$, $FeCl_3$, $SnCl_4$, etc. After impregnation, the support is dried in air and if the reduced metal catalyst is desired, it is reduced in hydrogen for a sufficient time at a suitable temperature. The nature of the salts used to impregnate the support is not critical. For example, a sample of granular carbon having a surface area and pore size distribution as required herein was impregnated with a mixture of $PtCl_4$ and $CuCl_2 \cdot 2H_2O$ and an identical carbon sample was impregnated with an equivalent mixture of $Pt(NH_3)_4(NO_3)_2$ and $Cu(NO_3)_2 \cdot 6H_2O$. After drying the catalysts and reducing them to the metallic state in hydrogen, both had the same analysis and possessed the same activity for the desired reaction.

In the stoichiometric reaction of acetic acid, ethylene and oxygen to produce vinyl acetate, two mols each of acetic acid and ethylene are required for every mol of molecular oxygen. Since the acetic acid is not likely to undergo undesired reactions while the ethylene is likely to enter into undesired reactions such as conversion to acetaldehyde, carbon dioxide, etc., it is preferred to utilize at least about a stoichiometric ratio of acetic acid to ethylene up to about a 50 to 1 mol ratio of acetic acid to ethylene in order to minimize the conversion of ethylene to undesired by-products. Higher acetic acid to ethylene ratios than this can be used, but are not desired due to the large volume of recycle acetic acid involved. The preferred mol ratio of acetic acid to ethylene is from about 1.5 to about 8 to 1. It is also desirable to operate with an ethylene to oxygen mol ratio of at least one and preferably at least about 1.5. The mol ratio of ethylene to oxygen can be high as 10 or more, however, at the higher ranges the conversion is reduced. At the lower ethylene to oxygen mol ratios, particularly below one, the degradation of the ethylene to carbon dioxide is significantly enhanced.

This reaction of acetic acid can conveniently be carried out within a temperature range of about 50° to about 250° C. and preferably within a temperature range of about 80° to about 125° C. At the lower temperatures of reaction rate is reduced with an increase in selectivity to vinyl acetate, while at the higher temperatures, the reaction rate, both of the desired reaction and the reaction to undesired products, is increased. The pressure at which the reaction can be conducted is preferably between about atmospheric pressure and about 60 atmospheres. Although higher pressures than this can be utilized under certain circumstances, the danger of explosion is increased. A reaction pressure of less than one atmosphere may be utilized but without special advantage particularly in light of the added expense of obtaining subatmospheric pressures. The acetic acid can be present in the reaction zone either in the gas phase or in the liquid phase with the phase depending upon the temperature-pressure relationship present in the reactor. In general the reaction rate is increased by an increase in pressure; therefore, operation at an elevated pressure and reduced temperature tends to increase both the reaction rate and selectivity to vinyl acetate. For commercial operation the pressure and temperature must be properly coordinated with the other variables to obtain a desired economy of operation.

In carrying out the reaction the reactants are passed preferably through a fixed bed of the catalyst. When the acetic acid is in the liquid phase, the reactants are preferably passed downflow over the catalyst bed with the acetic acid trickling over the catalyst, while the reactants can be passed either downflow or upflow over the catalyst when the acetic acid is present in the gas phase. At certain temperature-pressure conditions the acetic acid can be present in both the liquid and gas phase and in this situation downflow operation is preferred.

Any gaseous inert diluent can be conveniently used with the feed mixture, although none is required. The inert diluent, when used, can constitute up to about 95 mol percent of the feed stream although this high amount is not desirable because of separation problems. The diluent when used, is preferably in the range of about 5 to 50 mol percent of the feed stream. Since air is the most convenient and economical source of oxygen, atmospheric nitrogen is the most convenient and the preferred inert diluent gas. Water or steam is not a desirable diluent since it enhances undesired reactions and in fact the presence of moisture in the feed may make it desirable to dry the feed stream.

The total feed stream including the acetic acid, ethylene, oxygen and inert diluent, if any, is generally passed through the catalyst at a gas hourly space velocity (calculated as such even though the acetic acid may be present in the reactor in either the liquid phase, gas phase or both the liquid and gas phase) of about 50 to about 1500 and preferably about 200 to about 1,000. Based on ethylene the gas hourly space velocity can be between about 25 to about 1000 and preferably about 50 to about 800. As the space velocity is lowered, the conversion increases while the selectivity to vinyl acetate decreases and the opposite occurs as the space velocity is increased. Therefore, space velocity is correlated with the other variables to obtain the optimum results in any specific operation. Substantially all of the acetic acid that is not converted to vinyl acetate is recycled. On the other hand air being essentially free, economy as to oxygen is not critical. However, since ethylene represents a significant raw material cost and is capable of significant reaction to unrecoverable by-products, it is most convenient and meaningful to calculate conversion, selectivity and yield with reference to the ethylene, and to conduct the operation both for good conversion and for good ethylene selectivity.

The following examples are illustrative of my invention and are set forth without any intention of limiting the invention.

EXAMPLE 1

A solution of 0.46 gram of $PtCl_4$ and 0.36 gram of $CuCl_2 \cdot 2H_2O$ in 8 cc. of water was added to 10 grams of 10 to 20 mesh activated carbon. The activated carbon was prepared by pulverizing bituminous coal to 325 mesh powder, pelleting it with about 10 percent of a pitch binder, crushing the pellets to 10 to 20 mesh, calcining at 500° to 700° C. in an inert atmosphere and then activating with steam at 850° to 950° C. to form an activated carbon having a surface area of about 907 m.$^2$/g., a pore diameter distribution of about 85 percent between 10 and 25 angstrom units, a real density by helium displacement of 2.1 g./cc., an iodine number of about 1125 and carbon tetrachloride adsorption of 60 and 65 weight percent. The pore size distribution was determined by the method described by Juhola and Wiig in the Journal of Am. Chem. Soc. 71, 2069 (1949) using the water desorption isotherm and the surface area from the BET nitrogen isotherm described by Brunauer, Emmett and Teller in the Journal of Am. Chem. Soc. 60, 309 (1938). The catalyst was then dried in air at 110° C. for 16 hours and hydrogen was then passed over the catalyst at 400° C. for four hours at a gas hourly space velocity of approximately 300 per hour. The resulting catalyst contained 2.5 weight percent platinum and 1.31 percent copper giving a platinum to copper molar ratio of 0.6 with a surface area of 837 m.$^2$/g. and with no change in the pore size distribution.

EXAMPLE 2

Five gram samples of catalysts differing only in the metal content, each prepared as described in Example 1 including the same catalyst described in Example 1, were tested under identical conditions. The catalyst was placed in a one-half inch diameter reactor and a mixture of acetic acid, ethylene and air was heated to 120° C. and was passed at one atmosphere over the catalyst at an hourly flow rate of 70 millimols, 46 millimols and 17 millimols (as oxygen) respectively. The results are set forth in Table I.

TABLE I

| | Pt, wt. percent | Cu, wt. percent | Pt/Cu, mol/mol | Reaction rate [1] |
|---|---|---|---|---|
| Run: | | | | |
| 1 | 2.5 | 2.56 | 0.32 | $3.3 \times 10^{-4}$ |
| 2 | 2.5 | 1.31 | 0.62 | $4.0 \times 10^{-4}$ |
| 3 | 2.5 | 6.8 | 1.2 | $2.8 \times 10^{-4}$ |

[1] Mols of ethylene to vinyl acetate per hour per gram of catalyst.

In Run 2 the yield of vinyl acetate was 4.35 percent based on ethylene and 5.9 percent based on oxygen with a reaction selectivity of approximately 95 percent based on ethylene, the remainder being converted primarily to acetaldehyde and carbon dioxide. The rate of ethylene to vinyl acetate in Run 2 was also determined to be $4.65 \times 10^{-7}$ mols per square meter of catalyst surface area per hour.

EXAMPLE 3

Additional runs were conducted at the same conditions used in Example 2 and using catalysts prepared as described in Example 1 differing only in their metal content. The results are set forth in Table II.

TABLE II

| | Pt, wt. percent | Cu, wt. percent | Pt/Cu, mol/mol | Reaction rate [1] |
|---|---|---|---|---|
| Run: | | | | |
| 4 | 0.7 | 0.33 | 0.6 | $1.4 \times 10^{-4}$ |
| 5 | 1.3 | 0.67 | 0.6 | $2.2 \times 10^{-4}$ |
| 2 | 2.5 | 1.3 | 0.6 | $4.0 \times 10^{-4}$ |
| 6 | 5.0 | 2.1 | 0.6 | $4.5 \times 10^{-4}$ |

[1] Mols of ethylene to vinyl acetate per hour per gram of catalyst.

It is noted in Table II that the reaction rate increases rapidly as the platinum content increases from 0.7 to 2.5 weight percent but levels off rapidly between 2.5 and 5.0 weight percent platinum. It has been ascertained that the decrease in reaction rate is the greatest after 4.0 weight percent platinum with no significant increase in rate as the platinum content is increased above about 4.0 weight percent platinum.

EXAMPLE 4

Five grams of a catalyst containing 2.5 weight percent platinum and 1.31 weight percent copper with a platinum to copper mol ratio of 0.6 on a carbon support having 60 percent of its pore diameters in the 10 to 25 angstrom unit range were used at the same reaction conditions and flow rates as used in Example 2. Vinyl acetate was produced at the rate of $2.0 \times 10^{-4}$ mols per gram of catalyst per hour or 2.17 percent based on ethylene. The corresponding rate based on catalyst surface area is $2.23 \times 10^{-7}$ mols of ethylene to vinyl acetate per square meter per hour.

EXAMPLE 5

Example 4 was repeated at the same conditions and flow rates except that the catalyst contained 2.5 weight percent platinum with a platinum to copper mol ratio of 0.3 on the same base as used in Example 4. Vinyl acetate was produced at the rate of $1.4 \times 10^{-4}$ mols per gram of catalyst per hour or 1.52 percent based on ethylene.

EXAMPLE 6

Another run was made at the same conditions and flow rates as were used in Example 2 with a 2.5 weight percent platinum and 1.31 weight percent copper on 10 to 20 mesh carbon having a surface area of about 628 m.$^2$/g. and about 45 percent of the pore diameters in the 10 to 25 angstrom unit range. Vinyl acetate was produced at the rate of $0.77 \times 10^{-4}$ mols per gram of catalyst per hour or 0.84 percent yield based on ethylene. The corresponding rate based upon catalyst surface area is $1.23 \times 10^{-7}$ mols of ethylene to vinyl acetate per square meter per hour.

In Table III the mols of ethylene converted to vinyl acetate per square meter of catalyst per hour and the corresponding fraction of catalyst pore diameters in the 10 to 25 angstrom unit range are tabulated for several runs in which only the catalyst support is varied. This illustrates that at constant conditions and with catalyst surface area normalized the reaction rate of ethylene to vinyl acetate is a function of the pore size distribution and it also indicates the significance of the pore size distribution in the yield of vinyl acetate.

TABLE III

| Example: | Pore distribution [1] | Reaction rate [2] |
|---|---|---|
| 2, run 2 | 85 | $4.65 \times 10^{-7}$ |
| 4 | 60 | $2.23 \times 10^{-7}$ |
| 6 | 45 | $1.23 \times 10^{-7}$ |

[1] Percent of pore diameters in 10 to 25 angstrom range.
[2] Mols of ethylene to vinyl acetate per square meter of catalyst surface area per hour.

EXAMPLE 7

A further run was carried out with the same conditions, flow rates and catalyst as used in Run 2 of Example 2 except that the support was 10 to 20 mesh silica having a surface area of about 260 m.$^2$/g. and essentially no pore diameters in the 10 to 25 angstrom unit range. Vinyl acetate was produced at the rate of $0.4 \times 10^{-4}$ mols per gram of catalyst per hour or a 0.44 percent yield with a reaction selectivity of 60 percent to vinyl acetate, both based on ethylene.

EXAMPLE 8

An unsupported platinum-copper alloy, containing 75 weight percent platinum, was prepared by passing hydrogen at room temperature and a gas hourly space velocity of 300 per hour over a mixture of $Pt(NH_3)_4(NO_3)_2$ and $Cu(NO_3)_2 \cdot 6H_2O$ until a very exothermic reaction was completed. The temperature of the mixture was then raised to 200° C. and the hydrogen flow continued for two hours. The resulting gray product was identified by X-ray diffraction to be a platinum-copper alloy and was found to have a surface area of approximately 2 m.$^2$/g. The conditions and flow rates used in Example 2 were repeated using 10 grams of the alloy in 10 to 20 mesh size. No vinyl acetate was formed. The experiment was repeated using 25 grams of this alloy. Again no vinyl acetate was formed.

EXAMPLE 9

In another experiment using the same conditions and flow rates as used in Example 2 with a catalyst containing one percent palladium on carbon having a surface area of about 830 m.$^2$/g. with about 85 percent of its pore diameters in the 10 to 25 angstrom range, vinyl acetate was produced at a rate of $3.8 \times 10^{-4}$ mols per gram of catalyst per hour which is a yield of 4.1 percent based on ethylene and a reaction selectivity of 95 percent to vinyl acetate.

EXAMPLE 10

Example 9 was repeated except that the catalyst was one percent palladium on a carbon having a surface area of 717 m.$^2$/g. with about 45 percent of its pore diameters in the range of 10 to 25 angstroms. The reaction rate was $0.5 \times 10^{-4}$ mols per gram of catalyst per hour to vinyl acetate which is a yield of 0.54 percent based on ethylene with a reaction selectivity of about 70 percent to vinyl acetate.

It was also determined that iron and tin stabilize the activity of the noble metal catalyst but to a slightly less extent than copper. The reaction rate referred to herein is defined by the expression $R = F/W \times \theta$, where R is the reaction rate expressed as mols of ethylene converted to vinyl acetate per hour per gram of catalyst (or per square meter of catalyst surface area), F is the feed rate of ethylene to the reactor in mols per hour, W is the weight of catalyst in grams (or the surface area in square meters) and $\theta$ is the fraction of ethylene converted to vinyl acetate.

It is to be understood that the above disclosure is by way of specific example and that numerous modifications and variations are available to those of ordinary skill in the art without departing from the true spirit and scope of my invention.

I claim:

1. A process for preparing vinyl acetate from acetic acid, ethylene and oxygen which comprises contacting at a temperature between about 50° and about 250° C. and a pressure between about atmospheric and about 60 atmospheres a mixture of acetic acid, ethylene and oxygen with a catalyst consisting essentially of from about 0.5 to about five weight percent of a first metal selected from platinum, palladium, rhodium, ruthenium, osmium, iridium and mixtures thereof as the metal salt or in the metallic form and a second metal selected from copper, iron, tin or mixtures thereof as the metal salt or in the metallic form with the molar ratio of said first metal to said second metal being between about 0.1:1 to about 3:1 on a support having a surface area of at least about 600 m.$^2$/g. with at least about 80 percent of its pores having a diameter between about 10 and about 35 angstroms.

2. A process in accordance with claim 1 in which the first metal is platinum metal.

3. A process in accordance with claim 1 in which the first metal is palladium metal.

4. A process in accordance with claim 1 in which the catalyst is platinum metal and copper metal in a molar ratio of from about 0.3:1 to about 0.9:1.

5. A process in accordance with claim 4 in which the platinum to copper ratio is about 0.6 and the platinum is present in the catalyst in the amount of about 2 to about 3 percent.

6. A process in accordance with claim 1 in which at least about 90 percent of the pores have a diameter between about 10 and about 25 angstroms.

7. A process in accordance with claim 6 in which the surface area of the catalyst is at least about 800 square meters per gram.

8. A process in accordance with claim 1 in which the temperature is from about 80° to 125° C.

References Cited

UNITED STATES PATENTS

| | | | |
|---|---|---|---|
| 3,190,912 | 6/1965 | Robinson | 260—497 |
| 3,275,680 | 9/1966 | Holzrichter et al. | 260—497 |
| 3,441,601 | 4/1969 | Sennewald et al. | 260—497 |

FOREIGN PATENTS

| | | | |
|---|---|---|---|
| 615,596 | 9/1962 | Belgium | 260—497 |
| 648,814 | 12/1964 | Belgium | 260—497 |
| 1,371,111 | 7/1964 | France. | |

LORRAINE A. WEINBERGER, Primary Examiner

V. GARNER, Assistant Examiner

U.S. Cl. X.R.

252—438, 441, 447, 455 Z, 459, 460; 260—604 AC